United States Patent [19]
Hollis

[11] 3,797,781
[45] Mar. 19, 1974

[54] DECELERATION RESPONSIVE FLOW VALVE

[75] Inventor: James T. Hollis, Fountain Valley, Calif.

[73] Assignee: The United States of America as represented by the Secretary of the Air Force, Washington, D.C.

[22] Filed: Oct. 30, 1972

[21] Appl. No.: 301,927

[52] U.S. Cl............... 244/1 SC, 102/105, 137/501, 244/117 A
[51] Int. Cl.............................................. B64g 1/00
[58] Field of Search.......... 244/1 SC, 117 R, 117 A; 102/105; 137/501

[56] References Cited
UNITED STATES PATENTS

| | | | |
|---|---|---|---|
| 3,410,502 | 11/1968 | Leadon et al..................... | 244/15 C |
| 3,223,115 | 12/1965 | Kates................................... | 137/501 |
| 3,596,677 | 8/1971 | Clark et al........................... | 137/501 |
| 3,138,009 | 6/1964 | McCreight................... | 244/117 A X |
| 2,514,514 | 7/1950 | Puster................................. | 137/501 |

Primary Examiner—George E. A. Halvosa
Assistant Examiner—Barry L. Kelmachter

[57] ABSTRACT

A coolant fluid is supplied to a permeable nose tip of a re-entry vehicle from a coolant reservoir through a flow control valve having a spool type piston and sleeve valve wherein the orifice area changes as a function of deceleration. A second piston and sleeve valve is provided in the output of the flow control valve to maintain a constant pressure difference across the flow control valve.

1 Claim, 2 Drawing Figures

PATENTED MAR 19 1974 3,797,781

DECELERATION RESPONSIVE FLOW VALVE

BACKGROUND OF THE INVENTION

In the transpiration cooling of a re-entry vehicle, the coolant can be expelled through the nose of the vehicle at rates adequate to limit surface temperatures to acceptable levels. The rate of cooling is normally a function of aerodynamic heating. To utilize the coolant efficiency, a means of matching the coolant flow rate to the aerodynamic heating is required.

BRIEF SUMMARY OF THE INVENTION

According to this invention, use is made of the fact that aerodynamic heating is a result of the compression of air ahead of the vehicle. It is apparent that there will be a correlation between heating rates and the deceleration of the vehicle. The deceleration force can therefore be used to control the fuel flow to the nose of the vehicle.

Since the stagnation pressures, into which the coolant is being forced, increases generally as the heating increases and also since the supply pressure for the pressurization system may fluctuate, a control is provided to maintain a constant pressure difference across the control valve. The metering part of the valve is shaped to provide a desired flow as a function of deceleration.

IN THE DRAWING

DETAILED DESCRIPTION OF THE INVENTION

Figure 1:
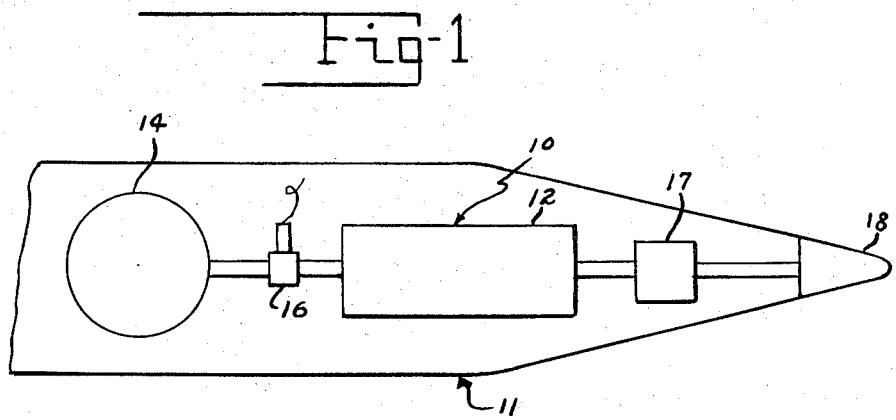
FIG. 1 is a schematic diagram of a fluid expulsion system for the transpiration cooling of a re-entry vehicle, according to the invention.

Reference is now made to FIG. 1 of the drawing, which shows a fluid expulsion system 10 for the transpiration cooling of a re-entry vehicle 11 having a coolant reservoir 12. The coolant reservoir 12 is of the type having a diaphragm or piston, wherein the fluid is expelled by moving the diaphragm or piston with compressed gas from a gas bottle 14 when a squib valve 16 is opened to pass gas from bottle 14 into coolant reservoir 12. A control valve 17 controls the flow of coolant to the nose tip 18 as a function of deceleration of the vehicle. The tip 18 may be a conventional tip and may be of the porous type or the type with channel passages.

Figure 2:
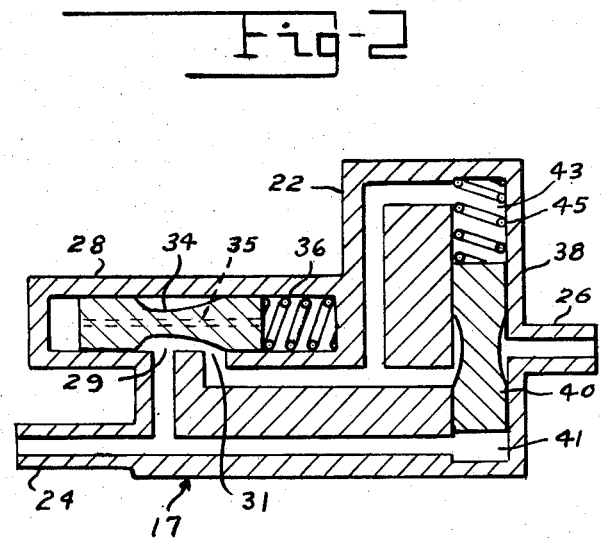
FIG. 2 is a sectional view of the flow control valve used in the device of FIG. 1.

The control valve 17, shown in greater detail in FIG. 2, has a housing 22, a fluid input 24 and a fluid output 26. A spool type sleeve valve 28 has an input orifice 29 connected to input 24 and an output orifice 31 connected to output 26. The valve 28 has a spool valve 34, made of a material such as tungsten, encased in stainless steel, to form an acceleration and deceleration sensitive mass which works against spring 36 to form a deceleration sensitive valve. The cross sectional area of the spool decreases in the direction of motion of the spool with deceleration, so as to provide an increase in orifice area of the valve with an increase in deceleration. The spaces at the end of the spool provide damping. Normally, leakage around the spool will be sufficient to set the damping at the proper level. However, where needed a passage 35 may be provided to prevent too great a pressure build up at the ends of the spool 34.

A constant difference pressure valve 38 is connected between orifice 31 and output 26. The input pressure is supplied to one side of valve spool 40 in chamber 41 and the output pressure of valve 28 is supplied to the other side of spool 40 in chamber 43. A spring 45 is provided in chamber 43 to establish the desired differential pressure across valve 28. By locating the axis of spool 40 at right angle to the direction of motion, it is made substantially independent of deceleration force. In systems where it is necessary to align the spool with the axis of motion, such as for packing considerations, the spool should be made of a light material such as aluminum to minimize the effect of deceleration of the valve. Otherwise, the spool 40 may be made of other materials, such as stainless steel.

In the operation of the device, squib valve 16 is energized to supply gas pressure to storage reservoir 12 during re-entry. The decelerating force, resulting from the compression of air ahead of the vehicle, moves the valve spool 34 to the left to increase the flow through the valve to thereby increase the flow through nose tip 18. A decrease in pressure in the output of valve 28 moves the spool 40 in a direction opposed to spring 45 to decrease the flow through valve 38 to provide a compensating increase in pressure in the output of valve 28. A like correction in the opposite direction is made with an increase in pressure.

The flow through a valve is given by the expression $$q = C_D A (\sqrt{2g\Delta P}/w)$$

where
$q$ = flow through the valve
$C_D$ = discharge coefficient of valve orifice
$A$ = area of valve orifice
$g$ = acceleration of gravity
$\Delta P$ = pressure difference across valve
$w$ = specific weight of the fluid.

The area of the orifice is made a function of the valve position $x$ since the cross section of the valve spool decreases in the direction of motion with deceleration.

$$A = f(x)$$

The valve position is proportional to the weight of the spool W, the deceleration force G and inversely proportional to the spring rate K for spring 36.

$$x = WG/K$$

Thus, the flow through the valve 28 may be expressed as $$q_1 = C_D f[(WG/K)](\sqrt{2g\Delta P}/w)$$

Since $C_D$, W, K, $g$ and $w$ are constants and since $\Delta P$ is held constant by valve 38 the flow through the valve 28 is given by the expression $$q_1 = K_1 f(G).$$

There is thus provided an improved method and apparatus for supplying coolant fluid to a permeable nose tip of a re-entry vehicle.

I claim:

1. An apparatus for controlling the flow of coolant from a coolant reservoir to a permeable nose tip of a re-entry vehicle comprising a deceleration responsive valve having a coolant input orifice and a coolant output orifice; means for supplying a compressed gas to said coolant reservoir; a squib valve connected between the gas supplying means and the coolant reservoir; means, within said deceleration responsive valve for controlling the flow from the input orifice to the output orifice in response to deceleration of the vehicle; means for supplying coolant from said reservoir to said input orifice; means for supplying coolant from the output orifice to the permeable nose tip; means for maintaining a constant pressure difference across the deceleration responsive valve; said means for maintaining a constant pressure difference across the deceleration responsive valve being a spool type piston and sleeve valve connected in the output of said deceleration responsive valve with the axis of the spool being positioned at right angle to the direction of motion; a spring, having a predetermined spring rate, on one side of said piston; means for supplying deceleration-responsive-valve output pressure to the side of said spool type piston adjacent said spring and means for supplying deceleration-responsive-valve input pressure to the side of the spool type piston, remote from said spring.

* * * * *